(12) United States Patent
Minkovitch

(10) Patent No.: US 10,967,240 B2
(45) Date of Patent: *Apr. 6, 2021

(54) SPORTS MATCH REFEREEING SYSTEM

(71) Applicant: FB-MM LTD., Modiin (IL)

(72) Inventor: Zvi Minkovitch, Modi'in (IL)

(73) Assignee: FB-MM LTD., Modiin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,624

(22) Filed: Feb. 20, 2020

(65) Prior Publication Data

US 2020/0215411 A1 Jul. 9, 2020

Related U.S. Application Data

(63) Continuation of application No. 15/877,404, filed on Jan. 23, 2018, now Pat. No. 10,596,444, which is a (Continued)

(51) Int. Cl.
*A63B 71/06* (2006.01)
*G02B 27/01* (2006.01)
(Continued)

(52) U.S. Cl.
CPC .......... *A63B 71/06* (2013.01); *A63B 71/0669* (2013.01); *G02B 27/017* (2013.01); *G02B 27/0172* (2013.01); *G02B 27/0179* (2013.01); *G06F 3/013* (2013.01); *G06F 3/03547* (2013.01); *H04N 7/185* (2013.01); *H04R 1/028* (2013.01); *A63B 71/0605* (2013.01); *A63B 2071/068* (2013.01); *A63B 2071/0666* (2013.01); *A63B 2071/0677* (2013.01); *A63B 2102/20* (2015.10); *A63B 2102/22* (2015.10); *A63B 2225/50* (2013.01); *A63B 2243/0025* (2013.01); *A63B 2243/0037* (2013.01); *A63B 2243/0095* (2013.01);
(Continued)

(58) Field of Classification Search
CPC ...... A63B 71/06; G02B 27/017; H04N 7/185; H04R 1/028
See application file for complete search history.

(56) References Cited

U.S. PATENT DOCUMENTS 5,636,920 A 10/1997 Shur et al.
5,898,587 A 4/1999 Bell et al.
(Continued)

FOREIGN PATENT DOCUMENTS

WO 2010030737 A1 3/2010
WO 2013017957 A2 7/2013

OTHER PUBLICATIONS

ISR of PCT Application No. PCT/IB2012/002000 mailing date Mar. 22, 2013 (2 pages).
(Continued)

*Primary Examiner* — Dave Czekaj
*Assistant Examiner* — Berteau Joisil
(74) *Attorney, Agent, or Firm* — May Patents Ltd.

(57) ABSTRACT

A system for refereeing a sports match including a portable processing device for compiling data associated with the sports match and eyeglasses including data display means for displaying the data associated with the sports match to a wearer of the eyeglasses.

30 Claims, 6 Drawing Sheets

Related U.S. Application Data continuation of application No. 14/777,125, filed as application No. PCT/IB2013/056052 on Jul. 24, 2013, now Pat. No. 9,889,367.

(60) Provisional application No. 61/802,966, filed on Mar. 18, 2013.

(51) Int. Cl.
  *G06F 3/01* (2006.01)
  *G06F 3/0354* (2013.01)
  *H04N 7/18* (2006.01)
  *H04R 1/02* (2006.01)
  *A63B 102/20* (2015.01)
  *A63B 102/22* (2015.01)

(52) U.S. Cl.
  CPC .. *A63B 2244/102* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 6,122,559 A | 9/2000 | Bohn |
| 7,037,198 B2 | 2/2006 | Hameen-Anttila |
| 6,984,176 B2 | 10/2006 | Bishop |
| 7,277,361 B1 | 10/2007 | Baba |
| 7,289,083 B1 | 10/2007 | Canova |
| 7,479,949 B2 | 1/2009 | Jobs et al. |
| 7,616,098 B2 | 11/2009 | Ai-Sabah |
| 7,646,914 B2 | 12/2010 | Clausi et al. |
| 8,235,529 B1* | 8/2012 | Raffle ............... G06K 9/00604 351/209 |
| 2003/0027629 A1 | 2/2003 | Pimienta |
| 2008/0172374 A1 | 7/2008 | Wolosin et al. |
| 2009/0131174 A1 | 5/2009 | Hutchinson-Kay et al. |
| 2009/0268483 A1 | 10/2009 | Donahue |
| 2010/0102938 A1 | 4/2010 | Delia et al. |
| 2010/0110368 A1* | 5/2010 | Chaum ................. G02C 11/10 351/158 |
| 2010/0210244 A1 | 8/2010 | Andreasson et al. |
| 2011/0098083 A1 | 4/2011 | Lablans |
| 2011/0218854 A1 | 8/2011 | Shamlian |
| 2012/0050668 A1 | 3/2012 | Howell et al. |
| 2012/0249741 A1 | 10/2012 | Maciocci |
| 2012/0299870 A1 | 11/2012 | Chi et al. |
| 2013/0002724 A1 | 3/2013 | Heinrich et al. |
| 2013/0297403 A1 | 7/2013 | Manning |
| 2017/0069139 A1* | 3/2017 | Chen ...................... H04N 5/272 |

OTHER PUBLICATIONS

ISR of corresponding PCT Application No. PCT/IB2013/056052 mailing date Apr. 9, 2014 (3 pages).
Supplementary European Search Report of corresponding EP application No. 12819249, dated Mar. 19, 2015 (2 pages).
Mihaly Zsiros: "Google Glass for the referees! | Zsiros Mihaly PhD hallgato" Mar. 5, 2013 http://phd.zsirosmihaly.hu/en/google-glass-for-the-referee/.
www.glovers-scorebooks.com/soccer.htm, May 15, 2010.
"I, Referee" mobile app, Dec. 23, 2009.
Smart Measure, "http://androgeoid.com/2010/09/measure-distances-heights-and-direction-with-your-android-phone-using-smart-measure", date reviewed: v. 1.1.1, Sep. 6, 2010 (5 pages).

* cited by examiner

SPORTS MATCH REFEREEING SYSTEM

CROSS-REFERENCE TO RELATED APPLICATIONS

The present application is a continuation of U.S. patent application Ser. No. 15/877,404, filed on Jan. 23, 2018, which is a continuation application of U.S. patent application Ser. No. 14/777,125, filed on Sep. 15, 2015, (U.S. Pat. No. 9,889,367, issued Feb. 13, 2018), which is a national phase of International Application PCT/IB2013/056052, with an international filing date of Jul. 24, 2013, which claims benefit from U.S. Provisional Patent Application No. 61/802,966, filed Mar. 18, 2013, all of which applications are hereby incorporated by reference as fully set forth herein.

FIELD OF THE INVENTION

The present invention relates to sporting events generally and to management of sports matches in particular.

BACKGROUND OF THE INVENTION

Traditionally, a sports referee may use several tools to manage a sports match. For example, in a football (soccer) match, the tools may include a coin to toss deciding the team initially in possession of the ball, red and yellow cards to indicate penalties and warnings, and watches to keep track of the game time and the accumulation of injury time. During the football match the referee may also use a writing instrument and paper to record information such as yellow/red card warnings issued, scored goals by each team and time of score, the identity of a goal scorer, player substitutions, distances on the playing field, and other information. After the football match, the referee has generally manually compiled information about the match so it may be recorded in a report, for example, by national and/or international league officials and/or organizations. Such a compilation process may be time consuming, and may include inaccuracies as the referee attempts to reconstruct the events of the match after the fact.

In addition to the sports referees, many observers of sports matches, for example, journalists, broadcasters, and spectators, often independently record their own observations during a sports match, and then may afterward reconcile their observations with the official record. Sports fans may be eager to keep abreast of a match while it is in progress, without having to wait for a reporter to post his observations.

U.S. Pat. No. 6,122,559 to Bohn describes "a hand held soccer scoring computer for tracking and recording conditions and activities taking place in a soccer match includes a keypad for entering and a display for showing information evolving during the course of the event with regard to player, team, activity and activity location, and the game time associated with the entry. The recorded data may be contemporaneously reviewed and edited and upon completion of the soccer match transferred to a processor printing in desired statistical formats."

SUMMARY OF THE PRESENT INVENTION

There is provided, in accordance with an embodiment of the present invention, a system for refereeing a sports match comprising a portable processing device for compiling data associated with the sports match; and eyeglasses comprising data display means for displaying the data associated with the sports match to a wearer of the eyeglasses.

According to an embodiment of the present invention, the data display means includes a data display screen.

According to an embodiment of the present invention, the data display screen includes a touch screen.

According to an embodiment of the present invention, the eyeglasses include an eye tracking mechanism.

According to an embodiment of the present invention, the eyeglasses include a touch pad.

According to an embodiment of the present invention, the eyeglasses include an imaging unit.

According to an embodiment of the present invention, the imaging unit includes means to zoom into match events.

According to an embodiment of the present invention, the imaging unit includes a range finder.

According to an embodiment of the present invention, the eyeglasses include a focusing viewfinder.

According to an embodiment of the present invention, the eyeglasses include a microphone.

According to an embodiment of the present invention, the eyeglasses include a transceiver for communicating with the processing device.

According to an embodiment of the present invention, the eyeglasses include a sound transducer.

According to an embodiment of the present invention, the data display screen displays the match data real-time.

According to an embodiment of the present invention, the data display screen displays the match data in replay format.

According to an embodiment of the present invention, the system additionally includes a warning display screen.

According to an embodiment of the present invention, the warning display screen includes at least one of a single sided screen and a double sided screen.

According to an embodiment of the present invention, at least one of a single sided and a double sided screen display a red colored background.

According to an embodiment of the present invention, at least one of a single and a double sided screen display a yellow colored background.

According to an embodiment of the present invention, the warning display screen includes means to communicate with at least one of the eyeglasses and the processing device over a wireless communications network.

According to an embodiment of the present invention, at least one of the eyeglasses and the processing device communicate with a data server comprising a communications server and a data storage.

According to an embodiment of the present invention, at least one of the eyeglasses and the processing device includes means to upload match data from the data server.

According to an embodiment of the present invention, at least one of the eyeglasses and the processing device includes means to download match data to the data server.

According to an embodiment of the present invention, the eyeglasses include means to control operation of the data display means.

According to an embodiment of the present invention, the sports match is a football (soccer) match.

According to an embodiment of the present invention, the data display screen includes a plurality of thin vertical lines.

According to an embodiment of the present invention, the plurality of thin vertical lines is equally spaced.

According to an embodiment of the present invention, the data includes identification data associated with a player of the sport match.

There is provided, in accordance with an embodiment of the present invention, A method for refereeing a sports match comprising compiling data associated with the sports match on a portable processing device; and displaying at least a portion of the compiled data on a pair of eyeglasses.

According to an embodiment of the present invention, the method includes transmitting at least a portion of the compiled data to a plurality of glasses.

According to an embodiment of the present invention, transmitting is over a wireless communications network.

According to an embodiment of the present invention, the plurality of glasses is worn by match followers.

According to an embodiment of the present invention, the plurality of glasses is worn by refereeing personnel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
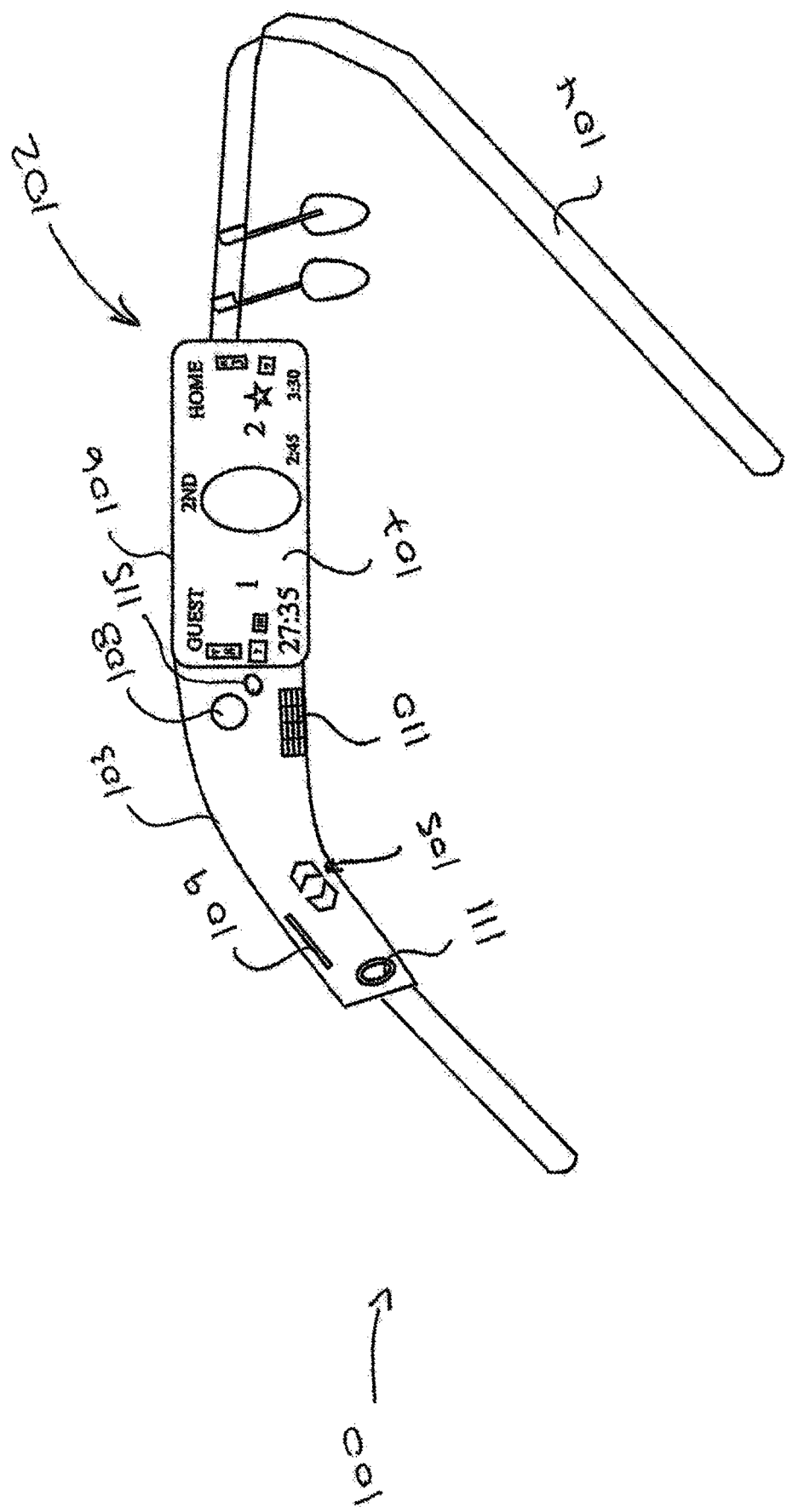
FIG. 1 schematically illustrates an exemplary data display glasses included in a portable FB-RS, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The Applicant, in WO 2013/017957 A2 (PCT Application PCT/IB2012/002000), the disclosure of which is incorporated herein in its entirety by reference, discloses "A system, method and apparatus for managing a football match on a hand held electronic device is presented. The hand held electronic devices includes a first display screen disposed substantially opposite a second display screen. Pre-match information for a first team and a second team are entered into the hand held electronic device. Match related events, such as goals, penalties and substitutions are entered on the hand held electronic device. The device compiles match events and said pre-match information into a match log, and wirelessly transmits the match log to a receiver, such as a match following device".

The Applicant has realized that the Football Match Management System (FB-MM) described in previously mentioned, co-pending PCT application PCT/IB2012/002000, or a similar hand held device suitable for managing one or more sports matches may be integrated with data display glasses as part of a portable refereeing system, hereinafter referred to as FB-RS, which may serve to assist one or more users monitor and/or referee sports matches, and which may include football matches. The smart glasses may include a display screen for displaying information associated with the match (match information or match data) such as, for example, team and player information, match duration and other time-related information, scoring information, and other match monitoring information which may be input to and/or processed by the FB-MM prior to, during, and following the match. The displayed information may include "real-time" data acquired during the match, which may be displayed in "replay" format. The smart glasses may include means for controlling the operation of the glasses, for example, for requesting data to be displayed on the display screen, for inputting data to be displayed on the screen, for activating on-glasses data acquisition means, and for activating on-glasses remote communication means. The control means may include use of voice-activation and eye-movement detection which may allow substantially "hands-free" operation of the FB-RS. Additionally or alternatively, the control means may include use of a touch-screen (on the display screen) or a touch-pad or other touch-activation means on the frame which may be manipulated while the glasses are worn.

Applicants have realized that the use of the FB-RS by referee and other refereeing personnel during a match may be potentially advantageous over the use of existing refereeing tools as match information may be readily displayed on the glasses upon request (verbally or through eye movement or by touching the screen or by touching one of the buttons) while allowing the refereeing personnel to continuously monitor the playing field.

Applicants have further realized that the FB-RS may be form part of a larger match monitoring system wherein part of the match data acquired in the FB-RS system may be shared over a wireless communications network with match followers, including spectators, team fans, journalists, broadcasters, among others. The match followers may view the shared match data through a dedicated application program which may be downloaded to their computing devices which may include personal computers, laptop computers, tablet computers, and mobile phones. The wireless communication network may include, for example a cellular network or a wide area network. Additionally or alternatively, the match followers may also wear smart glasses for viewing the shared match data.

Reference is now made to FIG. 1 which schematically illustrates an exemplary smart glasses 102 included in a portable FB-RS 100, according to an embodiment of the present invention. For exemplary purposes, FB-RS 100 will be described with reference to use in refereeing football (soccer) matches, although the skilled person may realize that the FB-RS may be used for refereeing substantially any sports match, for example, baseball matches, football matches, basketball matches, hockey matches, volleyball matches, cricket matches, boxing matches, among other type of sports matches. Smart glasses 102 may be worn by an eyeglass user over, or attached to, a pair of eyeglasses (optical glasses, sunglasses, etc.), or may also be worn by a user who does not wear eyeglasses.

Smart glasses 102 may include a frame 104, a touch pad 105, a display 106, an imaging unit 108, a transceiver 109, a microphone 110, and a sound transducer 111 (e.g. loudspeaker, earphone, etc.). Additionally, smart glasses 102 may include a housing 103 attached to frame 104 which may serve to house any one or more display 106, imaging unit 108, transceiver 109, microphone 110, and transducer 111. Smart glasses 102 may be worn by a referee during a football match to assist in monitoring and refereeing the match. Smart glasses 102 may additionally be worn by an assistant referee and/or by linemen to acquire information which may be transmitted to the referee during the match to assist in the refereeing process. The transmitted information may include visual images captured by the assistant referee and/or the linemen, and which may have been out of a line-of-sight and/or a field-of-view of the referee.

Display 106 may include a data display screen 107 for displaying data which may be viewed by the referee and/or other refereeing personnel continuously in the background without interfering with binocular vision. Data display screen 107 may be built into display 106, or alternatively, may be a separate unit which may be placed over the display and may be removable and/or replaceable. Data display screen 107 may be additionally or alternatively worn by the referee and/or refereeing personnel as part of a device which may resemble a wrist watch, or carried elsewhere in the body, for example, as part of a device which may be inserted in a pocket, attached to a belt, and the like. Additionally or alternatively, data display screen 107 may be viewed by the referee and/or the refereeing personnel as a projected image on a surface of a body part such as the hand, or projected on the surface of items, or projected as an image I midair. As an alternative to continuous data display, the data displayed on data display screen 107 may be viewed by the wearer on-demand responsive to verbal instructions issued by the wearer through microphone 110, or responsive to detection of wearer eye movement by an eye tracking mechanism 115 which may be included in housing 103 or on display 106 or elsewhere on frame 104, to wearer touching of the display, or to wearer pressing on touch pad 105, or any combination thereof.

Figure 2:
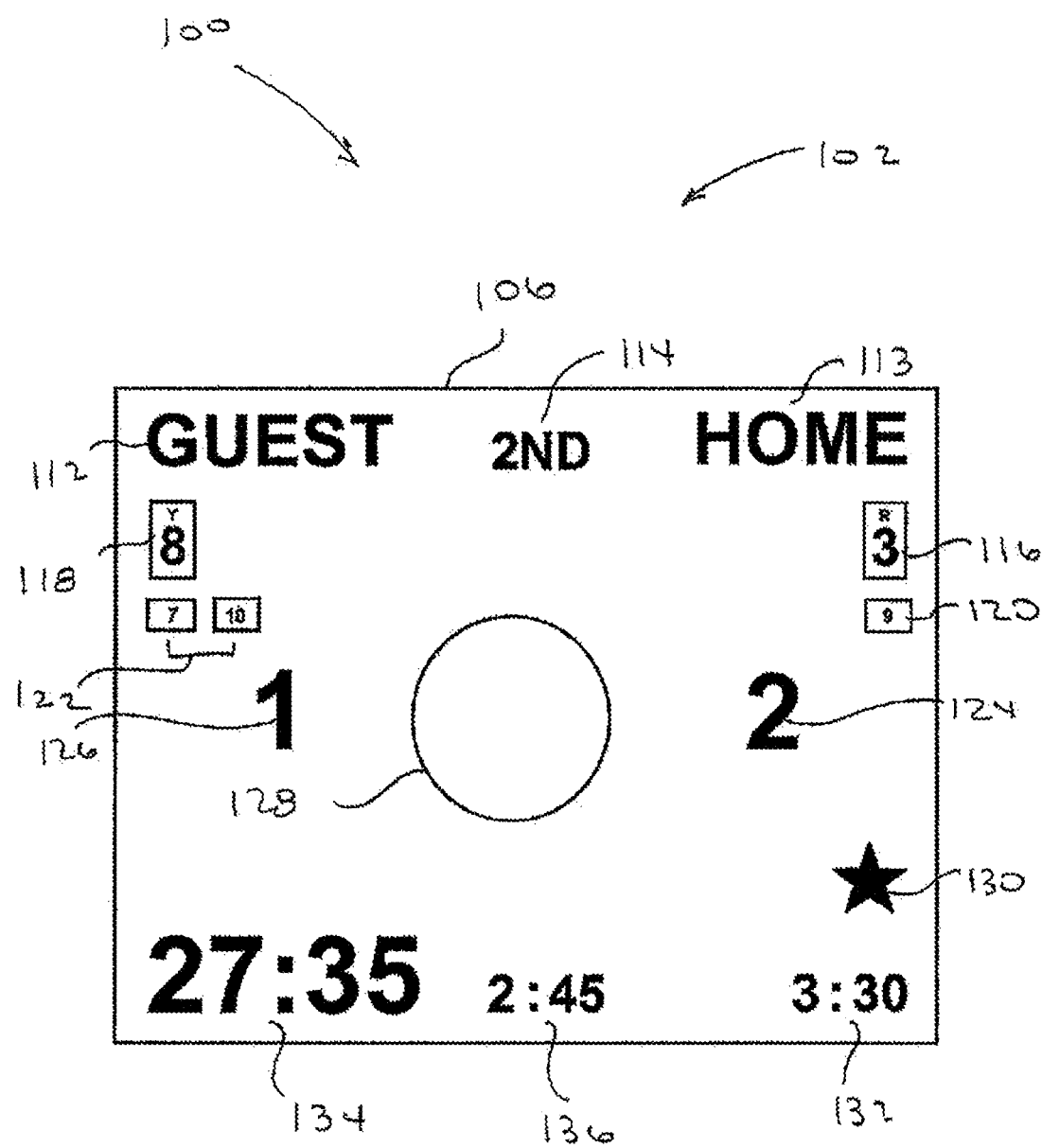
FIG. 2 schematically illustrates an exemplary data display screen in the glasses displaying match data, according to an embodiment of the present invention.

Reference is now also made to FIG. 2 which schematically illustrates data display screen 107 including exemplary match data displayed, according to an embodiment of the present invention. The displayed match data may be in a single color, for example white or black, or may have different colors which may vary according to the type of information displayed. The displayed data may be automatically acquired real-time by the RM-FS, acquired upon request by the wearer, preprogrammed according to predetermined criteria, or any combination thereof. Some of the displayed data may be manually input and/or downloaded to the FB-RS. The exemplary displayed data may include, but not be limited, to the following:
a) name of the guest team, 112;
b) name of the home team, 113;
c) match position (2.sup.nd half), 114;
d) penalty card issued to the home team (red card to player no. 3), 116;
e) penalty card issued to the guest team (yellow card to player no. 8), 118;
f) substitution icon for home team (player number 9 was substituted), 120;
g) substitution icon for guest team (players number 7 and 10 were substituted), 122;
h) goal score counter for home team (home team scored 3 goals), 124;
i) goal score counter for guest team (guest team scored 1 goal), 126;
j) viewfinder for imaging unit 108, 128;
k) alert symbol (indicate malfunctions, communication from other refereeing personnel, etc.), 130;
l) accumulated stop time counter, 132;
m) match time counter (duration), 134; and
n) additive time counter, 136.

Imaging unit 108 may include any type of video imaging unit suitable for mounting on housing 103 or elsewhere on frame 104 and for capturing both moving and stationary images during the match, including those of a ball, the players, and of the playing field itself. Imaging unit 108 may allow capturing the moving images which may be displayed on data display screen 107 in real-time and/or in replay format. Imaging unit 108 may include a range finder or other suitable means for measuring distances, for example, for measuring minimum distance between a defending player and the ball during a free kick (e.g. 9.15 m for free kick) or for measuring any other distances as may be required by the referee from time to time during the match. Imaging unit 108 may additionally include zooming capabilities to allow zooming into images in the playing field real-time and/or in replay format. Using the zooming and/or range finding features, imaging unit 108 may allow the referee or refereeing personnel to replay events which may be associated with a player being "off-side", a "hand ball" penalty, a "goal", ball "out of bounds", among many other aspects of a football match's events. Additionally, the zooming and range finding capabilities may allow detection of illegal ball movement during a free kick or a penalty kick and may set off an alarm which may be displayed on data display screen 107. Furthermore, imaging unit 108 may allow capturing images of the match players for comparing to previously stored data for corroborating player identity. Additionally or alternatively, range finding and zooming may be implemented and/or assisted through a focusing viewfinder 128 included in screen 106 which may allow the wearer to zoom in and out of the playing field and to determine distances. Additionally, zooming may include all-field viewing allowing the refereeing personnel to view the whole field from above. Imaging unit 108 may be a separate device externally connected to housing 103 or frame 104, or alternatively, embedded in the housing or the frame.

Figure 3:
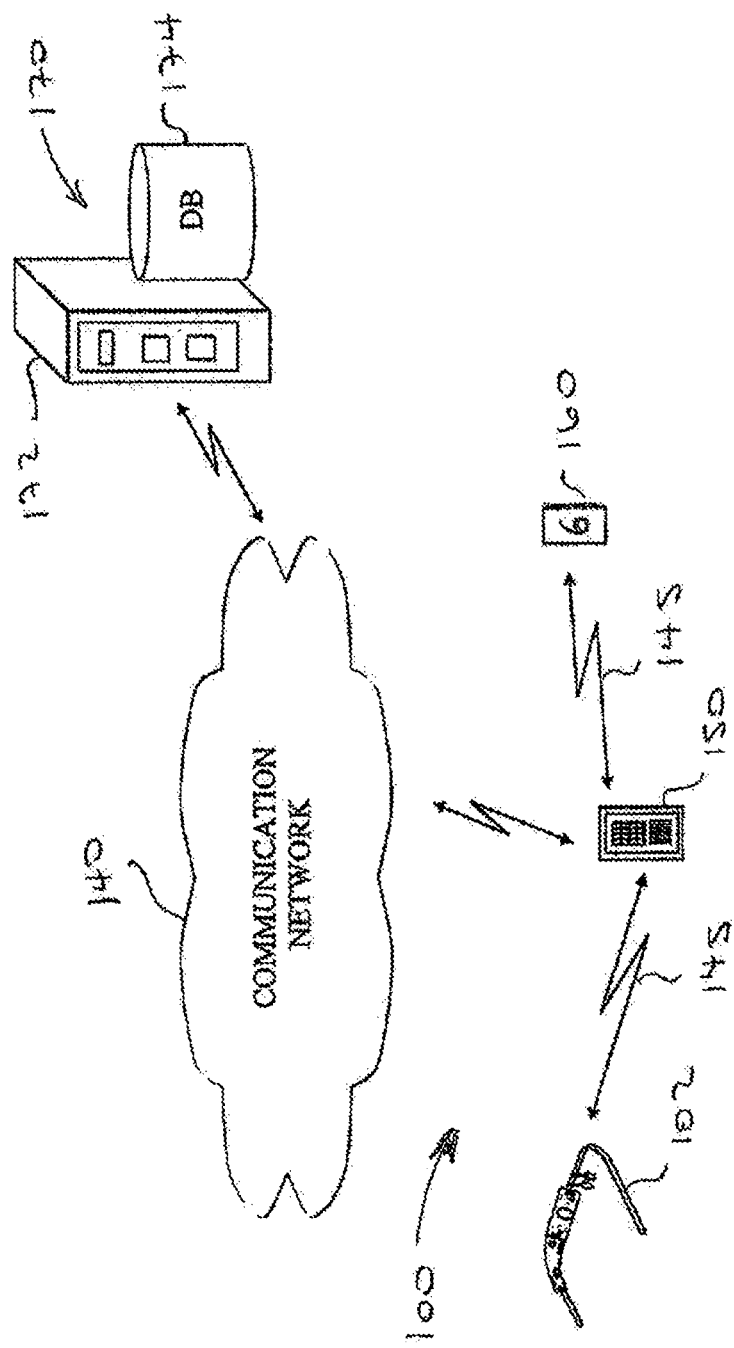
FIG. 3 schematically illustrates a portable FB-RS and its components which include the glasses and an FB-MM, according to an embodiment of the present invention.

Transceiver 109 may serve to communicate smart glasses 102 with other components of FB-RS 100 over wireless means, as described further on in greater detail with reference to FIG. 3. The communication may include receiving through transceiver 109 some of the match data displayed on data display screen 107. Additionally, the communication may include transmitting through transceiver 109 data acquired by means of glasses 102, for example, imaging data acquired by imaging unit 108 or verbally input data through microphone 110, or through touch contacting data display screen 107, or through manually manipulating touch pad 105 or through detection of eye movement in the wearer through eye tracking mechanism 115. Transceiver 109 may also be used for enabling verbal communications among wearers of glasses 102, for example, between the referee and refereeing personnel. Transceiver 109 may be formed as part of housing 103 or frame 104 and may include all suitable transmission and receiving circuitry, including an antenna. Alternatively, transceiver 109 may be attached to housing 103 or frame 104 as a separate component, the antenna forming part of the transceiver or alternatively embedded in housing 103 or frame 104 and to which the transceiver may be connected when attached to the housing or the frame.

Microphone 110 may be used by the wearer to verbally provide instructions to FB-RS 100 regarding system operation and/or operation of glasses 102. For example, the wearer may verbally activate/deactivate data display screen 107, transceiver 109, and/or imaging unit 108. The wearer may verbally instruct FB-RS 100 as to the type of match data to be displayed on data display screen 107, or may provide instructions to make changes in any of the displayed information (or to information to be displayed), for example that shown in FIG. 2. The wearer may additionally verbally enter data to FB-RS 100 through microphone 110, possibly overriding use of other data entry methods which may include use of touch pad 105 or touch data display screen 107. The wearer may additionally provide verbal instructions as to the contents of the data to be received and/or transmitted through transceiver 109, or provide verbal instructions for operating imaging unit 108 including for measuring distances and for zooming operation. Additionally, the wearer may record verbal data through microphone 110, and which may be stored on glasses 102 or elsewhere in FB-RS 100. Additionally, microphone 110 may be used by the referee and/or other refereeing personnel to record remarks associated with match events for inclusion in the report. Microphone 110 may additionally be used facilitate conversations between wearers of glasses 102 (e.g. the referee and refereeing personnel). Microphone 110 may be a separate device externally connected to housing 103 or frame 104, or alternatively, embedded in the housing or the frame.

Sound transducer 111 may allow the wearer to listen to himself/herself when entering data and/or providing verbal instructions through microphone 110. Sound transducer 111 may additionally allow the wearer to listen to verbal communications received, for example, as part of conversations held between the referee and refereeing personnel. Sound transducer 111 may additionally allow the wearer to receive match data which is displayed or being updated on data display screen 107 in audible form, for example through vocalization of the match data content or through a notification signal such as for example a "beep". Sound transducer 111 may be a separate device externally connected to housing 103 or frame 104, or alternatively, embedded in the housing or the frame. As a separate device, sound transducer 111 may be directly attached to housing 103 or frame 104 and may be removable and/or replaceable, or may be attached to the housing or the frame through a wired connection by means of a cable, or through a wireless connection, for example a Bluetooth connection to transceiver 109. Sound transducer 111 may include a miniature loudspeaker, an earphone, a headphone, or any other type of component or mechanism suitable for converting electrical signals to sound which may be heard by the user.

Reference is now made to FIG. 3 which schematically illustrates FB-RS 100 and its components which include glasses 102 and an FB-MM 150, according to an embodiment of the present invention. FB-RS 100 may additionally include a warning display screen 160.

FB-MM 150 may be a computerized control and data collection device and may include some or all of the features and functions included in the Football Match Management System (FB-MM) described in the previously mentioned, co-pending PCT application (published as WO 2013/017957 A2) including the figures therein. FB-MM 150 may be a similar device to the FB-MM but may be configured for use with one or more different types of sports, for example, for baseball, for football (US), for basketball, among other sports. FB-MM 150 may be adapted to transmit data, which may include data stored in the device, data processed by the device, and command data, to glasses 102, some of which may be displayed on data display screen 107. FB-MM 150 may be additionally adapted to receive data from glasses 102, which may include data acquired by the wearer (e.g. imaging data from imaging unit 108) and data, including command data, input by the wearer (e.g. through microphone 110 or by contacting data display screen 107, through eye movement, through manipulating touch pad 105, or any combination thereof). Examples of data which may be stored, transmitted and/or received, and or processed, by FB-MM 150 may include that described in the previously mentioned copending PCT application, suitably adapted according to the type of sport match to be managed and/or refereed.

FB-MM 150 may allow the wearer, for example the referee or other refereeing personnel to input information pertaining to the specific football match to be played, for example, the team names, player names and/or numbers, and the scheduled length of time for the match. The information may be manually input by the user through a keyboard or touch screen on FB-MM 150, or downloaded to the device from external sources, for example, a data server 170. Additionally or alternatively, some or all of the information may be downloaded by the wearer to FB-MM 150 from glasses 102. Some or all of the features described in the copending application and may be carried out using FB-MM 150 may be alternatively initiated from glasses 102. Some examples of these features may include simulating on FB-MM 150 a coin flip to determine which team has initial possession of the ball; signifying the start of the match to start a match clock; monitoring and recording goals, penalties, and player substitutions; recording times when match officials blow a whistle to track the sequence of events during the match. At the conclusion of the match, FB-MM 150 may be used to summarize the events of the match for generating a match report, and may include data acquired through glasses 102. FB-MM 150 may additionally collect data associated with all match events, including all data and commands, including verbal and visual data, including verbal recordings, into a log file which may serve for record purposes and as input to the match log. Additionally or alternatively, the events of the match may be stored in glasses 102 and the data may be downloaded to FB-MM 150 for generating the report. Additionally or alternatively, the events of the match may be stored in data server 170, as described further on below.

Communications between FB-MM 150 and glasses 102 may include use of a wireless medium 145, and may include use of communication technologies such as Wi-Fi, Bluetooth, ZigBee, IR (infrared), laser, among other wireless communication technologies known in the art. Additionally or alternatively, FB-MM150 and glasses 102 may include a wired connection so that the communication between them is over the wired connection.

FB-MM 150 may be implemented in a relatively small-sized computerized portable device which may be carried by the wearer of glasses 102 inside a pocket or attached to a belt or other clothing accessory. FB-MM 150 may be a dedicated device configured to be exclusively used with FB-RS 100, or may be a computerized portable device such as for example, a smartphone or tablet computer to which an application program may be downloaded and may allow the device to carry out the functions of the FB-MM.

Figure 4:
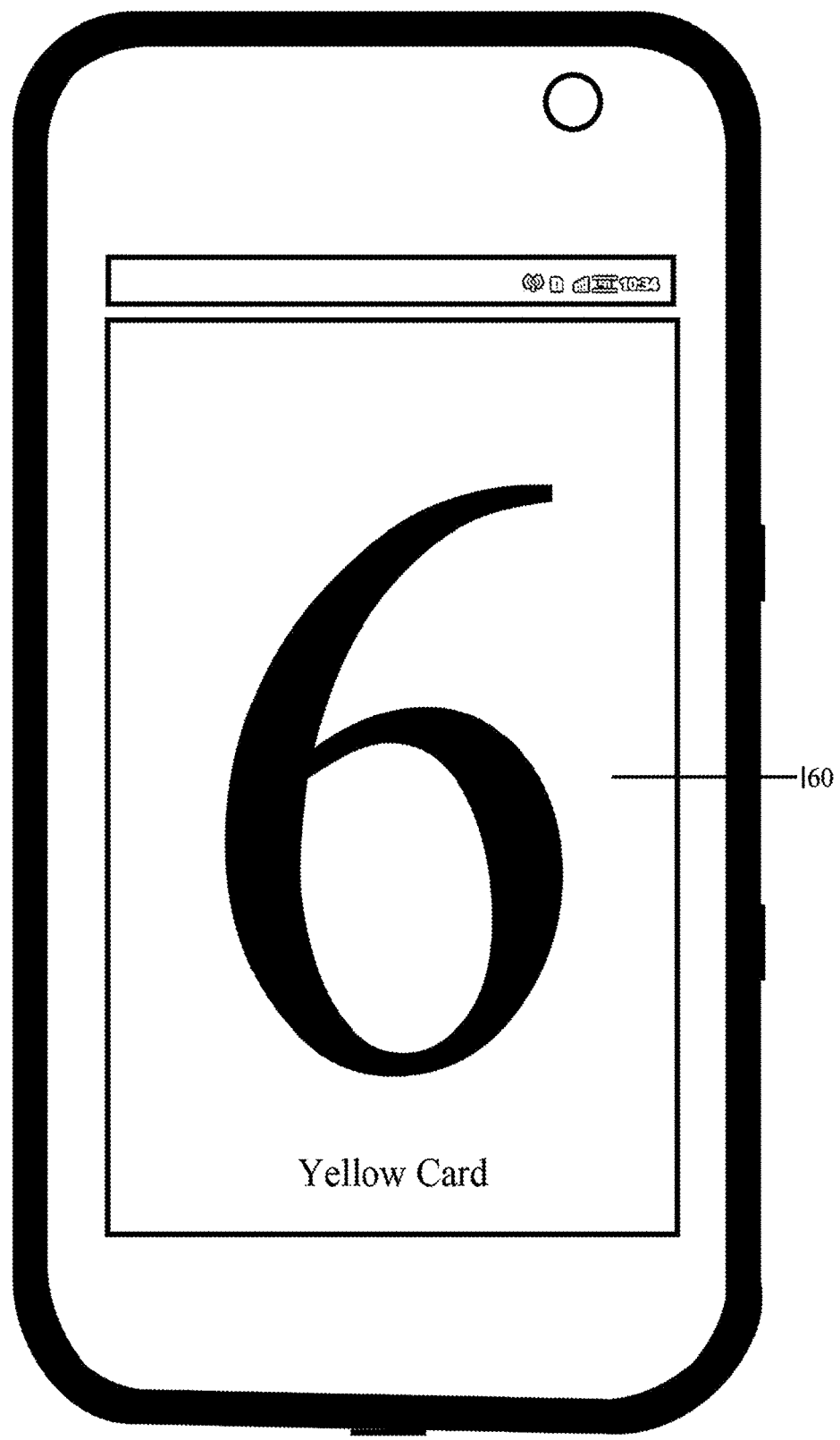
FIG. 4 schematically illustrates an exemplary warning display screen included in the FB-RS, according to an embodiment of the present invention.

Warning display screen 160 may be a single or double sided screen suitable for displaying a yellow background or a red background, functionally designated to play a same role as the yellow and red warning cards issued by the referee as a warning to a player during a match. An exemplary warning display screen 160 is shown in FIG. 4, according to an embodiment of the present invention. Warning screen 160 may additionally display against the colored background a number of a player who is being issued the warning, and may automatically change color from a yellow background to a red background when the same player has been twice issued a yellow background warning. Warning display screen 160 may communicate with FB-MM 150 and/or with glasses 102 over wireless medium 145 using the previously mentioned communication technologies, and the data displayed may be responsive to command data received either from glasses 102 or from FB-MM 150. Warning screen 160 may be of a relatively light weight so that it may be readily raised by the referee to clearly indicate to the match spectators that a player whose number is shown on the screen has been issued a warning. As an alternative to a separate device which acts as warning display screen 160, FB-MM 150 may include features enabling it to act as warning display screen. Such a feature is described in the co-pending previously mentioned PCT application.

Data server 170 may include a communications server 172 and a match data storage module 172. Communications server 172 may serve to transmit to, and/or receive data from, FB-RS 100 over a communications network 140. Communications server 172 may additionally serve to interconnect several FB-RS 100 during a football match, for example to interconnect the referee and refereeing personnel during the match as described further on below with respect to FIG. 5. Communications network 140 may include a mobile phone network, a wide area network (WAN), a local area network (LAN), or other types of suitable networks known in the art, or a combination thereof, and may include the Internet. Communications network 140 may be implemented over wireless means, which may include for example, a wireless WAN, WiMAX, Wi-Fi, a cellular network, a satellite network, among other types of wireless networks known in the art. Additionally or alternatively, communications network 140 may be implemented over wired means, which may include for example, telephone land lines, Ethernet connections, AC power lines, among other types of wired communications networks known in the art.

Data storage 174 may be a dedicated storage for storing information associated with all teams playing in a predetermined football league, and may include a list of all players in each football team and details related to the player. Team player information may include a photograph of the player, a uniform number, among other details. Data storage 174 may include access to Internet websites where team and team player information may be stored, and through which communications server 172 may access the information. Information stored in data storage 174 may be downloaded through communications server 172 to FB-MM 150 and/or to glasses 102 on a real-time basis, on a predetermined basis, or on demand by the wearer.

Data storage 174 may additionally serve as a storage site for uploaded data input to FB-RS 100 and acquired through glasses 102 and/or through FB-MM 150. The data may include real-time match information, or other type of information (e.g. replay-format information) acquired through FB-RS 100 as the match progresses. The information uploaded may include that displayed on data display screen 107 and/or stored in FB-MM 150, and may form part of the data used to generate the match report. The data for the match report may be stored in data storage 174 and downloaded on-demand to FB-MM 150 for generating the match report. Additionally or alternatively, the match report may be generated at data server 170 using the uploaded data. Use of data storage 174 for storing downloaded and uploaded data may be potentially advantageous as memory storage requirements for glasses 102 and FB-MM 150 may be substantially reduced (i.e. most of the data is stored in data storage 174 and may be downloaded/uploaded real-time). Communications server 172 may additionally serve to send parts or the complete match report, which may be stored in data storage 174, to match followers over communications network 140. Alternatively, communications server 172 may send other data stored in data storage 174 and associated with the match to the match followers over communications network 140. This data may include recorded input data acquired through the match, including images, verbal inputs by the referee and refereeing personnel, including conversations.

Figure 5:
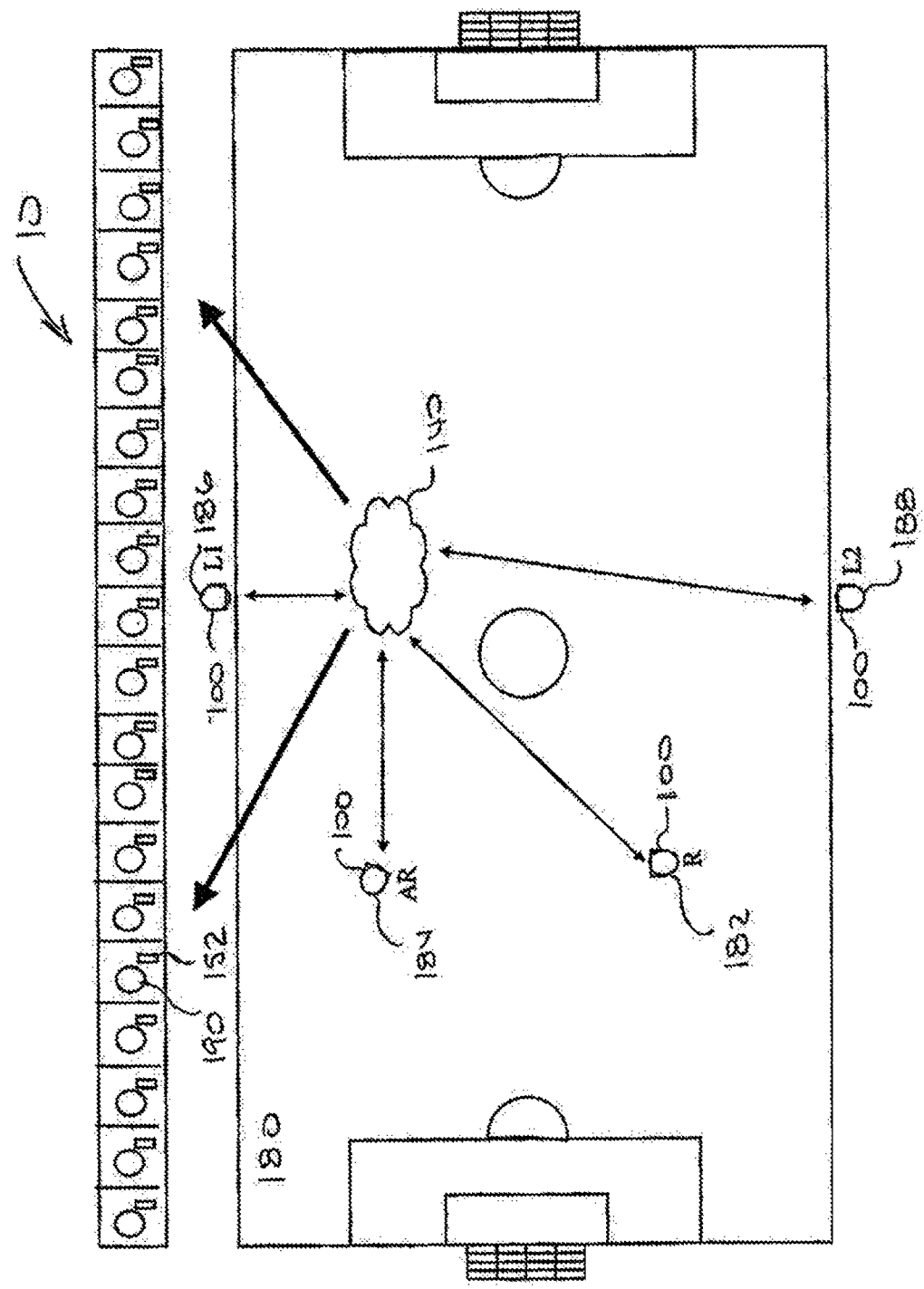
FIG. 5 schematically illustrates an exemplary implementation of an FB-RS for refereeing a football match and as part of a larger match monitoring system, according to an embodiment of the present invention.

Reference is now also made to FIG. 5 which schematically illustrates implementation of FB-RS 100 for refereeing a football match and as part of a larger match monitoring system 10, according to an embodiment of the present invention. The football match is played in a football field 180 and includes as refereeing personnel a referee 182, an assistant referee 184, a first lineman 186, and a second lineman 188. Each of the refereeing personnel is equipped with a FB-RS 100 which includes glasses 102 and a FB-RS 150 Referee 182 may be additionally equipped with a warning display screen 160. Additionally or alternatively, the warning display screen may be implemented in FB-MM 150 of referee 182.

FB-RS 100 of referee 182, assistant referee 184, first lineman 186 and second lineman 188 are interconnected through communications network 140 and may allow the refereeing personnel to verbally communicate with one another, and to share images captured real-time, during the game. For example, referee 182 may communicate with lineman 186/188 to discuss a call by the lineman, or may view through his (the referee's) glasses images acquired by the lineman during the play. Referee 182 may view the images on his glasses in replay-format, or alternatively, the referee may switch channels in his glasses, or through his FB-MM 150, to switch into real-time vision as seen by first lineman 186a or any other refereeing personnel through their glasses. The plurality of FB-MM 150 may be interconnected to allow the referee, or possibly the other refereeing personnel, to access information which may be captured real-time, or stored, in the FB-RS 100 of the other refereeing personnel.

Larger match monitoring system 10 may allow match data to be shared with match followers 190 over communications network 140. Match followers 190 may be present in the football stadium during the match, or may be remotely located anywhere in the world, and may be equipped with computing devices 152, for example personal computers, laptop computers, tablet computers, and mobile phones, including a downloaded dedicated application program which allows receiving match data from referee 182 FB-RS 100. Additionally, computing devices 152 may receive match data from other refereeing personnel FB-RS 100. Additionally or alternatively, the match data may be received from data server 170. Additionally or alternatively, match followers 190 may wear a modified version of smart glasses 102 which allows them to receive shared data directly to a receiver on the glasses over communications network 140. This modified version of smart glasses 102 may be potentially advantageous as it may be of a reduced cost for mass merchandising purposes, the reduced cost of the glasses achievable by providing only data reception and display functions on the glasses. The modified version of smart glasses 102 may include commercially available smart glasses known in the art and suitable for displaying the shared match data. An application program may be downloadable to the commercially available smart glasses to allow displaying the shared match data on the glasses. Also downloadable and displayable may be advertising contents and/or other data contents not limited to the shared match data. The match data received may include the match report, and may be received on a real-time basis during match progress. Alternatively, the match data may be received not real-time, and may include receiving the data only after the match has finalized. The match data received may be selective data and may vary according to a type of match follower 190. For example, journalists, broadcasters, and sports writers may receive match data which may include details not provided to spectators.

Figure 6:
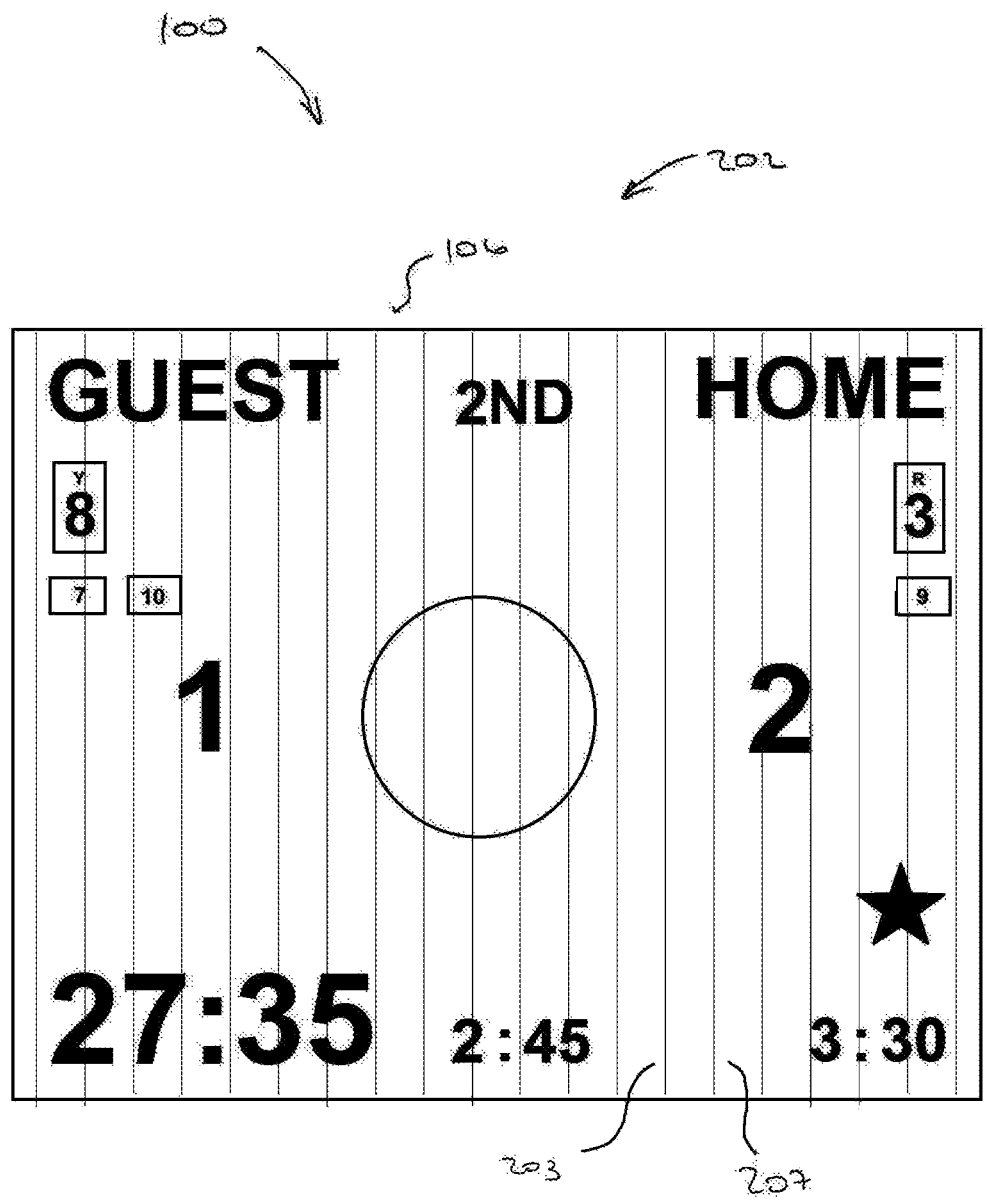
FIG. 6 schematically illustrates an exemplary data display screen in linesman smart glasses, according to an embodiment of the present invention.

Reference is now made to FIG. 6 which schematically illustrates an exemplary data display screen 207 in linesman smart glasses 202, according to an embodiment of the present invention. Linesman smart glasses 202 may be functionally similar to smart glasses 102 modified to allow a soccer game linesman to monitor and determine when an offensive game player is in an "offside" situation.

Data display screen 207 may be included in display 106 and may include a plurality of thin vertical lines 203 which may be used by the linesman to identify the position of players relative to one another. Lines 203 may be equally spaced and may represent a whole length of the playing field, or a section of the playing field. Lines 203 may allow glass 202 automatic detection of "offside" conditions where one or more offensive game players may be positioned in the playing field between a last defensive player and the goalkeeper. Additionally or alternatively, the detection may be visually performed by the linesman. Smart glasses 202 may be configured to emit a warning signal to the linesman of a detected offside condition and correspondingly an "offside" violation. The warning signal may be a visual signal displayed on data display screen 207. Additionally or alternatively, the warning signal may be an audio signal emitted through sound transducer 111. Glasses 202 may allow identification of the offensive play that has committed an offside violation, and may allow zooming into the playing area of the offensive player. Additionally, glasses 202 may allow automatic transmission of details associated with the offside violation to glasses 102 worn by the referee.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may include a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for voice activation comprising first and second devices for interaction between respective first and second persons, each of the first and second devices comprising:
   a first camera for capturing or imaging a visual image;
   a microphone configured and mounted for capturing the person originated voice;
   a first display configured and mounted for providing first visual data to the person;
   a sound transducer consisting of, or comprising, a loudspeaker, headphone, or earphone, that is configured and mounted for sounding an auditory data to the person;
   an antenna and a wireless transceiver coupled the antenna for wirelessly receiving and transmitting data over a wireless network;
   a software and a processor for executing the software, the processor coupled to control, receive data from, or transmit data to, the first camera, the microphone, the first display, the sound transducer, and the wireless transceiver; and
   a wearable eyewear frame configured for mounting or attaching thereon the processor, the antenna, the first camera, the wireless transceiver, the microphone, and the first display,
   wherein the first device is configured for transmitting, by via the antenna by the wireless transceiver of the first device, the visual image captured by the first camera of the first device, and wherein the second device is configured for receiving, by via the antenna by the wireless transceiver of the second device, the visual image captured by the first camera of the first device, and for displaying, by the first display of the second device, the received visual image, and wherein the first display of the first or second device is coupled to the respective microphone for displaying visual data on the first display in response to the person originated voice captured by the microphone of the respective first or second device.

2. The system according to claim 1, wherein each of the first and second devices further comprising a tactile surface responsive to the person touch or press mounted on, or attached to, the respective wearable eyewear frame, and wherein the respective device is operative to respond to the person touch or press.

3. The system according to claim 1, wherein the wireless transceiver is further coupled to the sound transducer for sounding the auditory data that is responsive to, includes, or is based on, data received from the wireless network.

4. The system according to claim 1, wherein each of the first and second devices further comprises a second camera configured and mounted for capturing or imaging a person eye or eyes, the second camera is coupled to the processor and is mounted on, or attached to, the respective wearable eyewear frame of the first and second devices.

5. The system according to claim 4, wherein in the first device or in the second device the visual image on the first display is responsive to a person eye movement captured by the second camera, or wherein in the first device or in the second device the visual image on the first display is responsive to the person touch or press sensed by the tactile surface.

6. The system according to claim 1, wherein the first device or the second device further comprises a memory coupled to the processor and to the first camera for storing the visual image captured by the first camera.

7. The system according to claim 1, wherein the second device is further operative to compare the visual image captured by the first camera of the second device and the received visual image captured by the first camera of the first device.

8. The system according to claim 1, wherein each of the first and second devices further comprises a distance measuring meter for measuring a distance coupled to the first display for displaying the measured distance, the distance measuring meter is coupled to the processor and is mounted on, or attached to, the respective wearable eyewear frame of the first and second devices, and wherein the distance measuring meter is based on light, laser, sound, ultrasonic sound, or optics.

9. The system according to claim 8, wherein the distance measuring meter is integrated with the first camera.

10. The system according to claim 1, wherein the first device or the second device further comprises a memory, and the respective first or second device is operative to store in the memory the received data from the wireless network.

11. The system according to claim 1, wherein each of the first and second devices is addressable in the wireless network.

12. The system according to claim 1, wherein each of the first and second devices is configured to, and shaped for, attach to an optical eye-glasses or sun-glasses.

13. The system according to claim 1, wherein the wireless transceiver consists of, or comprises, a modem (modulator/demodulator) using RF (Radio-Frequency) based Wireless Local Area Network (WLAN), Wireless Personal Area Network (WPAN), or Wireless Wide Area Network (WWAN).

14. The system according to claim 13, wherein the WLAN is according to, or based on, Wi-Fi standard, wherein the WPAN is according to, or based on, Bluetooth or ZigBee standard, wherein the WWAN is based on cellular or satellite communication.

15. The system according to claim 13, wherein the wireless network is according to, is based on, or is using, a Wireless Personal Area Network (WPAN), the antenna is a WPAN antenna, and the wireless transceiver is a WPAN transceiver.

16. The device according to claim 15, wherein the WPAN is Bluetooth®.

17. The system according to claim 1, wherein the first or second device further comprises a random number generator coupled to, or part of, the respective processor, for generating a random number.

18. The system according to claim 1, further comprising a tactile surface responsive to the person touch or press mounted on, or attached to, the respective wearable eyewear frame, and wherein the first display is coupled to the tactile surface so that the first device is further operative to display yellow or red background color on the first display in response to the person touch or press.

19. The system according to claim 1, wherein the first device further comprises a second display screen coupled to the processor and two opposed first and second exterior surfaces, and wherein the first display screen is attached to the first exterior surface and the second display is attached to the second exterior surface.

20. The system according to claim 1, wherein the sound transducer is coupled to the wireless transceiver and to the processor, and the first device is operative to vocalize at least part of the data received from the wireless network.

21. The system according to claim 1, further comprising a third device, the third device comprising:
   a software and a processor for executing the software, the software including an operating system;
   a memory for storing the software coupled to the processor;
   an input component, consisting of or comprising a keyboard or a tactile surface, coupled to the processor for capturing input data from a person;
   a display coupled to the processor for presenting visual information to the person;
   an antenna and a wireless transceiver coupled to the processor for wirelessly communicating with the first device; and
   a hand-held enclosure for housing the processor, the memory, the input component, the wireless transmitter, and the display,
   wherein the third device is operative to receive a first data from the person using the input component, to store the first data in the memory, to display the first data on the display, and to transmit the first data via the wireless transceiver to the first device, and wherein the first device is operative to wirelessly receive the first input data from the third device, to store the first data in the memory, and to display the first input data on the first display of the first device.

22. The system according to claim 21, wherein the third device is operative to receive the visual data captured by the first camera of the first device via the antenna by the wireless transceiver of the third device, and to display the received visual data on the display of the third device.

23. The system according to claim 21, wherein the third device consists of, or is part of, a smartphone or a tablet.

24. The system according to claim 21, wherein the third device is configured to, and shaped as, an eyewear device.

25. A system according to claim 1, further comprising a plurality of two or more devices, each identical to the first device, wherein the plurality of two or more devices are configured for communicating with each other over a communication network via the respective antennas and wireless transceivers.

26. The system according to claim 25, wherein the communication network is a Wireless Wide Area Network (WWAN) or a Wireless Local Area Network (WLAN), and each of the antennas is respectively a WWAN or WLAN antenna, and each of the wireless transceivers is respectively WWAN or WLAN wireless transceiver.

27. The system according to claim 1, wherein the visual image captured by the first camera of the first device comprises a first human image, and wherein the visual image captured by the first camera of the second device comprises a second human image.

28. The system according to claim 1, wherein the first or second device is configured to compare first and second human images for determining that they both include the same person.

29. The system according to claim 1, wherein the first or second device further comprises a memory coupled to the respective processor and to the respective microphone for storing a person originated voice.

30. The system according to claim 29, wherein the respective sound transducer is coupled to the respective memory for playing the stored person originated voice.

* * * * *